United States Patent [19]

Fuhrmeister

[11] 4,404,742
[45] Sep. 20, 1983

[54] METHOD AND APPARATUS FOR MOUNTING RIVETS OR THE LIKE IN A FLEXIBLE CARRIER

[75] Inventor: Ralph Fuhrmeister, Coopers Plains, Australia

[73] Assignee: Furma Manufacturing Co. Pty. Ltd., Coopers Plains, Australia

[21] Appl. No.: 281,039

[22] Filed: Jul. 7, 1981

[30] Foreign Application Priority Data

Jul. 18, 1980 [AU] Australia ............................. PE4596

[51] Int. Cl.$^3$ ........................ B23P 19/00; B25C 5/02
[52] U.S. Cl. ..................................... 29/798; 227/112
[58] Field of Search ................. 53/142, 580, 581, 397; 227/101, 112; 206/347, 343; 29/798, 253.3; 226/62, 67, 68; 83/685, 690, 691

[56] References Cited

U.S. PATENT DOCUMENTS

| | | | |
|---|---|---|---|
| 3,258,835 | 7/1966 | Boggild et al. | 227/112 |
| 3,910,213 | 10/1975 | Hoenig et al. | 83/685 |
| 3,971,116 | 7/1976 | Goodsmith et al. | 29/798 |
| 3,993,232 | 11/1976 | White | 226/68 |

Primary Examiner—Ervin M. Combs
Assistant Examiner—Steven E. Nichols
Attorney, Agent, or Firm—Schwartz, Jeffery, Schwaab, Mack, Blumenthal & Koch

[57] ABSTRACT

A method of making a carrier for rivets or similar articles which includes the steps of guiding a strip of pliable resiliently deformable material to pass an apertured die sequentially driving a number of rivets to the strip with a striker to cause part of the strip to be deformed and stretched into the die and to punch a hole through the strip into which the rivet is driven and held frictionally, with drawing the striker and the die from the rivet and advancing the strip to receive the next rivet.

4 Claims, 7 Drawing Figures

U.S. Patent    Sep. 20, 1983    Sheet 1 of 2    4,404,742
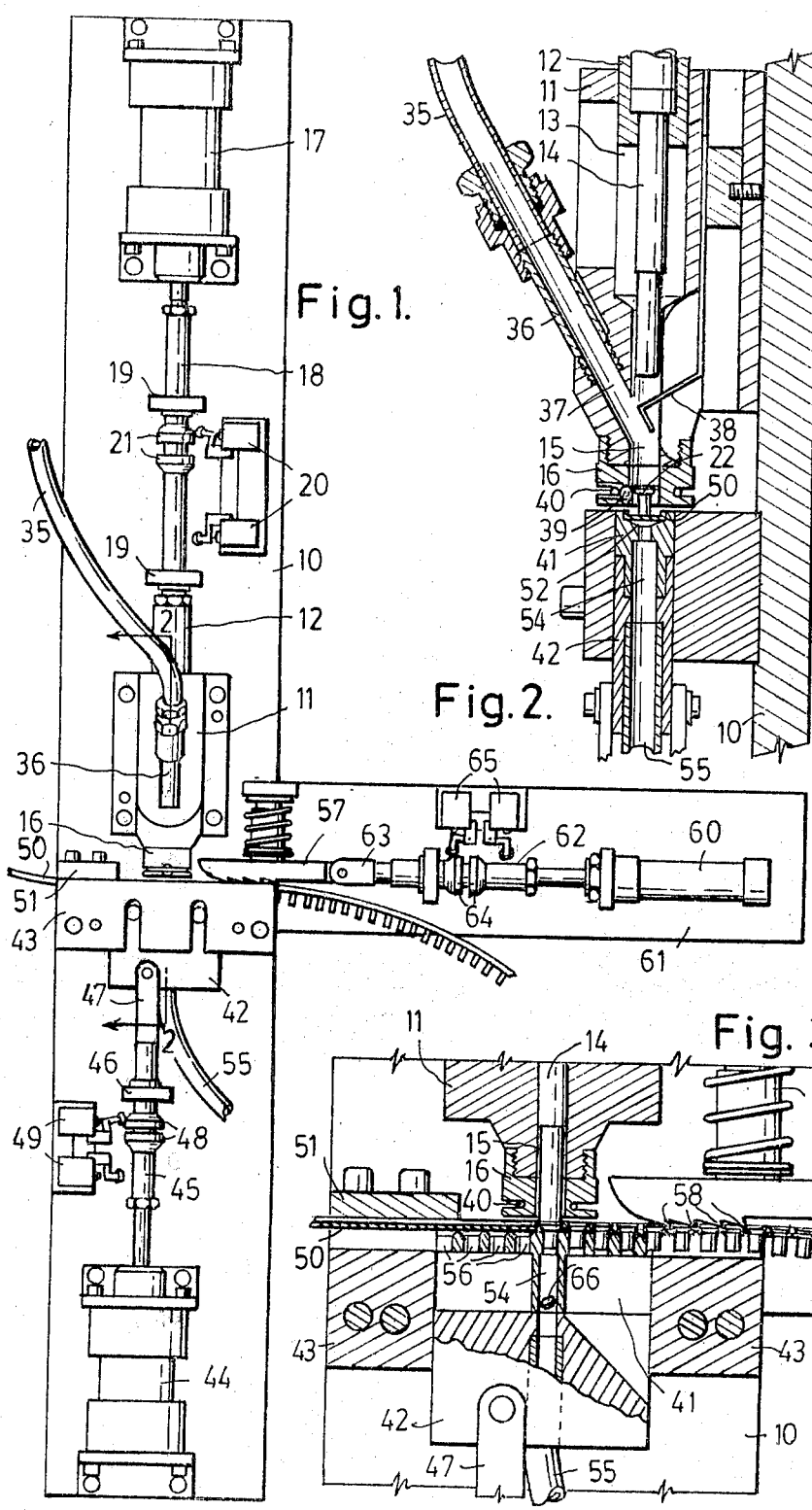

METHOD AND APPARATUS FOR MOUNTING RIVETS OR THE LIKE IN A FLEXIBLE CARRIER

BACKGROUND OF THE INVENTION (1) Field of the Invention

This invention relates to method and apparatus for mounting rivets or the like in a flexible carrier.

(2) Description of the Prior Art

Certain machines, such as riveting machines, nail guns and screw driving tools, are made to receive rivets, nails or screws fed to them on carriers which may be flexible strips formed with openings or jaws to receive the articles when the carriers are being charged, and from which the articles are driven or withdrawn in sequence by the driving machines. The manufacturing and the charging of any such carriers known to us is expensive and time consuming, and the length of such a carrier, and therefore the number of articles carried by it, is likely to be unduly limited, by technical considerations of its manufacture.

BRIEF SUMMARY OF THE INVENTION

The present invention has been devised with the general object of providing a simple and inexpensive carrier for rivets or other articles of a broadly similar character, which is quickly and economically charged with such articles in regularly spaced arrangement and capable of being made in very great lengths, the articles being held securely in the carrier but capable of being readily ejected therefrom by a riveting gun or like tool; and a method of and apparatus for making such a carrier.

Accordingly, the invention resides broadly, in one aspect, in a method of making a carrier of similar articles such as rivets, including the steps of guiding a strip of pliable resiliently deformable material to pass an apertured die, sequentially driving with a striker each of a number of similar articles to the strip to cause part of the strip to be deformed and stretched into the die and further to punch through the strip a hole into which the article is driven and held frictionally, withdrawing the striker and the die from the driven article, and advancing the strip to a position to receive a further article.

In another aspect, the invention resides in a carrier of similar articles made according to the said method.

In a further aspect, the invention resides broadly in apparatus for making a carrier charged with a series of similar articles including a striker, an annular die aligned coaxially with the striker, a guide for guiding a strip of pliable resiliently deformable material between the striker and the die, feed means for sequentially feeding articles to the strip in alignment between the striker and the die, means for advancing the striker to drive the article so as to stretch part of the strip into the die, to punch a hole through this stretched part and to drive the article part-way through the hold, means for retracting the striker and the die, and means for advancing the strip by engaging and moving an article driven through the strip. Other features of the invention will become apparent from the following description.

BRIEF DESCRIPTION OF THE SEVERAL VIEWS OF THE DRAWING

A preferred embodiment of the invention, for inserting rivets in a flexible strip carrier, is shown in the accompanying drawings, wherein:

FIG. 1 is a front elevation of the apparatus,

FIG. 2 is a sectional view, to larger scale, along line 2—2 in FIG. 1 showing a first stage in driving a rivet into the strip, FIG. 3 is a section to still larger scale, taken at right angles to the sectional view of FIG. 2, showing a second stage in the driving of the rivet.

DETAILED DESCRIPTION OF THE PREFERRED EMBODIMENT

Figure 4:
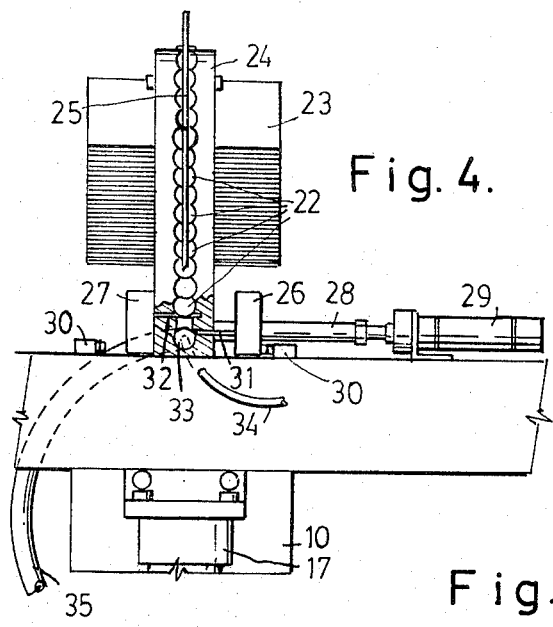
FIG. 4 is a partly broken-away front view of a device for feeding rivets to the apparatus shown in FIG. 1.

The apparatus includes an upright base 10 on which is mounted a guide block 11. A striker holder 12 vertically slidable in a passage 13 formed from the top of the block 11 holds a downwardly extending striker 14 slidable in a reduced diameter striker passage 15 through the lower part of the block 11 and through a cap nut 16 screwed onto a threaded bottom part of the block. The striker holder 12 and striker 14 are reciprocally movable by a pneumatic cylinder 17 fixed on the base 10, its piston 18, slidable in bearings 19, being secured coaxially to the striker holder 12, the stroke of the piston being controlled by pneumatic switches 20 acted on by adjustable coned stops 21 on the piston.

Rivets 22 are fed one at a time from a feeder device of known type which may conveniently be mounted on top of the base 10, and is shown in FIG. 4. A pneumatically oscillated hopper 23 (or a vibrating bowl feeder) delivers the rivets to a vertical rivet feed slot in an upright body 24, the rivets being substantially horizontal, their heads to the front in overlapping arrangement, and prevented from escape forwardly by a vertical retaining blade 25. A pair of reciprocating blocks 26 and 27 located to opposite sides of the body 24, are mounted on a common horizontal shaft 28 reciprocated by a pneumatic cylinder 29 the operation of which is controlled by pneumatic switches 30 contacted by the blocks on their movement away from the body 24. A stop blade 31 on the block 26 enters the body 24 laterally and, when the block 26 is advanced, is located under the lowermost of the rivets 22. When the block 27 is advanced, stop blade 32 on this block which enters the body 23 laterally is moved between the lowermost rivet and the next higher one, and, as the block 26 is retracted at the same time, the lowermost rivet falls into a rivet passage 33 in the body 23 and is impelled by a jet of air under pressure from an air line 34 to pass into a rivet hose 35. This hose, as shown in FIGS. 1 and 2, is connected to a rivet tube 36 leading into an oblique passage 37 in the guide block 11 and entering the punch passage 15 at an actue angle. A spring-wire guide arm 38 in the guide block 11 having its extremity shaped to guide the rivet 22 smoothly down through the punch passage 15 until, as shown in FIG. 2, it is brought to rest by balls 39, preferably three, in radial passages in the cap nut 16, the balls being urged to extend part way into the punch passage 15, to support the head of the rivet 22, by a resilient ring 40 in a groove about the cap nut.

A die insert 41 is replaceably fitted to the top of a die holder 42 vertically slidable in a die slide 43 fixed to the base 10, its top a short distance below the bottom of the cap nut 16. The die holder 42 is reciprocally movable by a pneumatic cylinder 44, mounted on the base 10, its piston 45, slidable in a bearing 46, being secured to a clevis 47 pivoted to the die holder. The stroke of the piston 45 is controlled by the interaction of a pair of coned stops 48 adjustably mounted on the piston and a pair of pneumatic switches 49.

The top of the die insert 41, and the tops of the parts of the die slide 43 to both sides of the die insert, are formed with a groove to receive closely and guide a pliable strip 50 extruded of a resiliently deformable plastics material and deepened at its sides so that it is of shallow channel formation. A considerable length of this strip may be carried by a spool (not shown) from which the strip 50 is fed through the groove and under a strip guide block 51. The rivet 22 supported in the striker passage 15 by the balls 39 has the bottom of its shank contacting or closely approaching the middle of the strip 50 as shown in FIG. 2.

Figure 5:
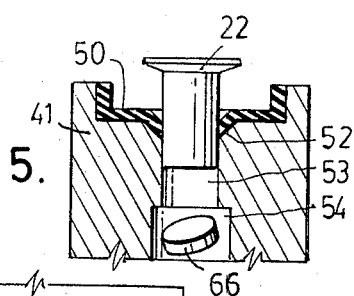
FIG. 5 is a large-scale sectional detail drawing showing the stretching of the strip penetrated by the rivet.

The die insert 41 is formed with a central die 52 which, as shown particularly in FIG. 5, has its upper part coned, diminishing down to a cylindrical lower part 53 which leads coaxially into a larger diameter slug passage 54 connected to a slug hose 55.

There are formed from the top of the die insert 41, to both sides of the central die 52, a number of holes 56 which, with the die, form a series of equally spaced parallel holes all capable of receiving the shanks of rivets 22.

A feeder bar 57 is located above the die slide 43 to the side of the cap nut 16 remote from the strip guide block 51. The underside of the feeder bar is formed with a series of ratchet teeth 58, and its thickness is such that it fits easily between the deepened sides of the strip 50 towards which it is pressed by a spring-loaded vertically slidable sleeve 59. The feeder bar 57 is reciprocated by a pneumatic cylinder 60 mounted on an arm 61 extending from one side of the base 10, its piston 62 being connected pivotally to the feeder bar by a clevis 63, the stroke of the piston being controlled by the interaction of a pair of adjustable coned stops 64 on the piston and a pair of pneumatic switches 65.

Appropriate pneumatic circuits (not shown) are provided for the automatic operation of the working parts of the apparatus.

In operation, rivets 22 are fed one at a time from the feeder apparatus, and the feed hose 35, each in turn being guided by the spring arm 38 into the striker passage 15 to be brought to rest by the balls 39, the rivert shank closely approaching or resting on the strip 50, as shown in FIG. 2. The striker 14 is advanced by the pneumatic cylinder 17 to drive the rivet downwards so that, as shown in FIGS. 3 and 5, the rivet acts as a punch, deforming the stretching part of the strip 50 into the coned die 52 and then excising a slug 66, or disc of stretched material of the strip, which is free to fall through the slug passage 54 and the slug hose 55 to any suitable receptable. The rivet is fully driven into the strip 50 so that the top of its enlarged head is about level with the top of the deepened sides of the strip.

Figure 6:
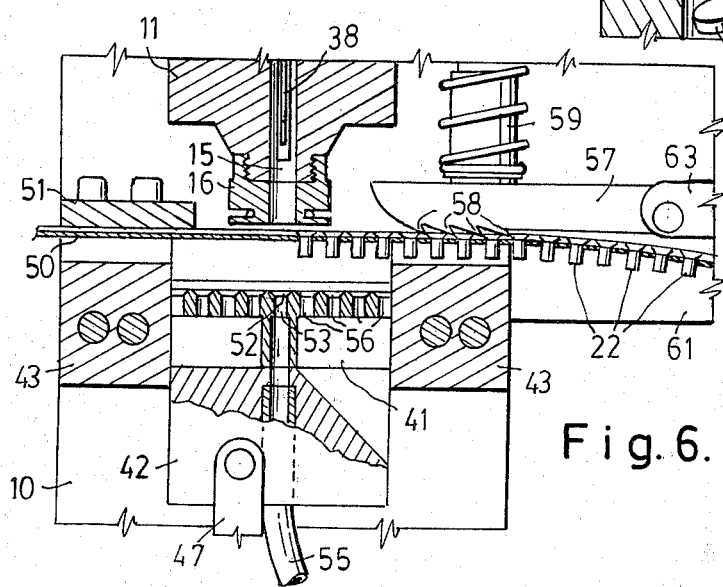
FIG. 6 is a sectional view similar to that of FIG. 3, showing a third stage in the driving of a rivet.
Figure 7:
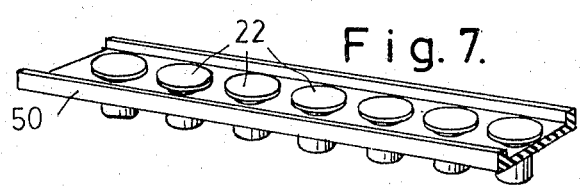
FIG. 7 is a perspective view of part of the strip carrier charged with rivets.

The striker 14 is then automatically retracted and the die holder 42 and die insert 41 are automatically lowered by the pneumatic cylinder 44. The feeder bar 57 is thereupon automatically moved by its pneumatic cylinder 60 from its retracted position shown in FIGS. 1 and 3 to its advanced position shown in FIG. 6, its ratchet teeth 58 engaging a number of rivets previously driven into the strip, advancing the strip to the position shown in FIG. 6.

The die holder 42 and die insert 41 are raised, holes 56 of the die insert engaging rivets driven through the strip, the feeder bar 57 is retracted to the position shown in FIGS. 1 and 3, its ratchet teeth 58 riding over rivet heads but without causing any retraction of the strip 50, held against any such movement by the engagement of the die insert holes 56 with rivets through the strip, and the process described is repeated, and so on. In this manner, a simple and inexpensive extruded strip of any desired available length may be charged with rivets in equally spaced arrangement, each held securely in place in the undersize hole through which its shank has been driven. The rivets may be driven in sequence from the carrier in a suitable rivetting machine having a strikers capable of driving the rivets, one at a time, through the strip the yieldable character of which permits the heads of the rivets to stretch the strip in passing through it.

While a pneumatically-operated apparatus has been described and illustrated, the cylinders 17, 44 and 60 may be hydraulically operated, controlled by electric switchtes in substitution for the pneumatic switches 20, 40 and 65. Alternatively, the apparatus could be totally mechanically operated and controlled or could be driven by electric stepping-motors electronically controlled, e.g., by punching tape or punch cards.

Various other changes and modifications may be made to the apparatus described and illustrated without departing from the scope of the present invention defined in the appended claims.

I claim:

1. Apparatus for charging a carrier strip of pliable, resiliently deformable material with a series of similar articles, comprising:
   (a) a striker, and means for advancing and retracting the same toward the strip for driving the article at least partially therethrough said strip in response to advancement of said striker, causing said strip to stretch and be formed with a punched hole for receiving said article,
   (b) die means including a central die aligned coaxially with said striker, and a series of equally spaced apertures aligned with said central die to receive and closely engage articles driven by said striker partially through said strip, said central die being formed to permit stretching of said strip by said article,
   (c) means for advancing and retracting said die means toward and away from said strip,
   (d) feed means for sequentially feeding the articles to the strip in alignment with and between said striker and said die means,
   (e) means for guiding said strip between said striker and said die means, in alignment with said central die and said apertures formed in said die means, and
   (f) means for advancing the strip, said advancing means engaging and moving articles driven through said strip so as to present a blank strip in the region of said central die.

2. Apparatus according to claim 1 wherein the part of the die means nearer to the striker is cone-shaped, tapering to a coaxial, substantially cylindrical part capable of receiving closely the leading end of the article driven through the strip.

3. Apparatus according to claim 1 wherein said means for advancing the strip includes a feeder member formed with teeth, and feeder actuating means for advancing the feeder member when the die has been retracted, said teeth engaging and moving articles driven through the tape, and for retracting said feeder member when the die has been advanced, said teeth during retraction riding over the articles so as not to cause movement of said strip.

4. Apparatus according to claim 1 wherein said striker is reciprocally slidable in a striker passage, said feed means includes a passage leading obliquely into the striker passage, and further including a resilient guide arm extending into the striker passage at its intersection with an oblique passage, said guide arm being shaped to direct an article passing through the oblique passage and divert it into the striker passage, said guide arm being defelected from the striker passage while the striker moves therethrough.

* * * * *